United States Patent [19]
Siegal

[11] Patent Number: 6,010,016
[45] Date of Patent: Jan. 4, 2000

[54] MODULAR TRAY SYSTEM

[75] Inventor: Burton L. Siegal, Skokie, Ill.

[73] Assignee: HDN Development Corporation, Florence, Ky.

[21] Appl. No.: 08/601,237

[22] Filed: Feb. 14, 1996

[51] Int. Cl.[7] .................................................. A47F 3/14
[52] U.S. Cl. .................. 211/126; 211/126.1; 211/126.3; 198/803.11; 198/867.15; 52/658
[58] Field of Search ................................ 211/126, 126.1, 211/126.3, 186, 121, 122; 198/803.11, 803.14, 803.15, 867.15, 803.2; 99/422, 449, 450, 404, 407; 52/658, 656.1, 656.8

[56] References Cited

U.S. PATENT DOCUMENTS

| | | | |
|---|---|---|---|
| 581,049 | 4/1897 | Unkenholz | 211/121 |
| 694,767 | 3/1902 | Mahoudeau | 34/204 |
| 811,720 | 2/1906 | Herder | 211/121 |
| 918,937 | 4/1909 | Wilmore | 211/121 |
| 988,262 | 3/1911 | Gulack | 211/121 |
| 3,807,057 | 4/1974 | Noel | 211/126 X |
| 4,033,450 | 7/1977 | Paddock et al. | 198/803.14 |
| 4,398,880 | 8/1983 | Seiling | 198/803.14 X |
| 4,560,139 | 12/1985 | Dahke | 198/803.14 X |
| 5,170,696 | 12/1992 | Reed | 99/349 |
| 5,178,260 | 1/1993 | Hochbein | 198/803.15 X |
| 5,613,596 | 3/1997 | Chang | 198/803.11 |
| 5,678,705 | 10/1997 | Tolbanos | 211/126 |

*Primary Examiner*—Derek J. Berger
*Assistant Examiner*—Kimberly Wood
*Attorney, Agent, or Firm*—Charles W. Calkins; Kilpatrick Stockton LLP

[57] ABSTRACT

A modular tray system comprising a tray portion releasably fastenable to support members for supporting the tray which communicate with attachment means for attaching, preferably releasably attaching, the support members to transport means for transporting the tray. The modular tray system of the present invention may be advantageously utilized in a commercial process for producing bakery products from dough.

22 Claims, 6 Drawing Sheets

MODULAR TRAY SYSTEM

FIELD OF THE INVENTION

The present invention relates to a modular tray system comprising components which may be assembled in different ways to provide trays of varying sizes. A preferred embodiment of the modular tray system of the present invention is particularly well suited for "proofing" dough products in processes for producing baked or fried dough-based products.

BACKGROUND

Many commercial production processes utilize conveyer transported trays. In a process for preparing bakery products from yeast containing dough, trays are often utilized in "proofing" the dough. Proofing refers to the portion of the process wherein the yeast is activated and the dough is allowed to rise. In a commercial process for preparing bakery products, such as breads, rolls, doughnuts, pastries and the like, from dough, the dough may be mixed and formed and then placed on "proofing trays" for proofing. In order to ensure reproducible results in the proofing process, the proofing trays may be maintained in an environment of relatively constant temperature and humidity. In some commercial processes, the proofing trays may also be utilized to carry the dough to the oven or fryer where the dough is to be baked or fried to produce the bakery product.

In a prior art process utilized by the assignee of the present application, the proofing trays form part of an assembly line process for producing fried bakery products (doughnuts). Dough is mixed and extruded in a doughnut shape onto horizontally disposed trays. The dough is proofed by carrying the dough containing trays, suspended by their ends on serpentine vertical conveyer belts or chains, through a relatively constant temperature/humidity environment for a period of time sufficient to allow the dough to rise. The dough containing trays are held by pins on the conveyer belt or chain such that they may swing and therefore remain substantially horizontal as they move over the pulleys or sprockets and vertically through the constant temperature/humidity environment. This is commonly accomplished by maintaining the center of gravity of the tray and the dough being proofed below the center of the conveyor attachment pin. The apparatus which includes the conveyer belt and dough carrying trays, and maintains the relatively constant temperature/humidity environment is generally referred to as a "Proofer". The time in the Proofer is a function of the length of the conveyor and its linear speed.

At a next station, after proofing, the proofed extruded dough is removed from the trays and placed into a fryer for frying. The removal of the dough from the trays is accomplished by tipping the trays, causing the dough to fall off the trays into the fryer where the dough is fried to produce doughnuts. This is commonly accomplished by having a portion of the moving tray strike a stationary portion of the proofer structure causing the tray to invert. It is further known to maintain the tray in the inverted position and cause the tray surface supporting the dough to pass horizontally above a stationary member spanning most of its length that will peel off a proofed dough that might still be clinging to the tray and cause it to fall.

Alternately, in other processes known in the art, the proofed dough may be lifted off the trays by hand, with or without, the use of a spatula or other lifting device. The proofed dough may then be placed onto racks for baking to produced baked products.

In still other embodiments known in the art, the trays utilized in proofing the dough are also utilized to hold the proofed dough during a baking or frying process. Then, after baking or frying, the final bakery product is removed from the trays for packaging and/or sale.

In heretofore known commercial baking processes, such as those utilized by the assignee of the present application, the trays utilized to carry the dough during the proofing process ("proofing trays") are generally produced from stainless steel. The ends of the proofing trays include means for attaching the proofing tray to the vertically disposed belt or chain utilized in the proofer. In order to achieve circulation around the extruded dough, and through the tray, the dough holding surface of the tray is generally of mesh construction. In addition, the dough holding surface may be convexly bowed, with the center slightly higher than each edge, along the axis running between the ends of the tray.

In prior art processes, the dimensions of the proofing tray depend on the size of the dough product to be carried on the tray and the size of the proofer. Manufacturers make their machinery in varying capacities, commonly increasing it by processing increasing quantities of dough objects being processed at the same time. Thus a doughnut proofer tray might have a length suitable for carrying 2, 4, 6, 8, 10 or more doughnuts, rolls, etc. The width of the proofing tray is sufficient to hold the dough product to be proofed. For economy of manufacture, it would be highly desirable to use as many common parts as possible. Generally, proofing trays are designed to be utilized with a particular proofer, thus the length of the proofing tray depends on the size of the proofer, in particular the distance between the conveyer belt or chains which support the ends of the proofing tray. Thus, a commercial establishment with different size proofers must disadvantageously have different sizes of proofing trays in order to have trays for each proofer.

Unbaked, freshly mixed, yeast containing dough products are generally sticky. For this reason, the dough supporting surface of the proofing tray is generally coated with an anti-stick, food product safe, coating such as teflon. Although, the metal utilized in producing the proofing trays may last through years of the use, the anti-stick coating will wear at a more rapid rate, thus necessitating that the proofing tray be re-coated up to several times during their years of service. A tray with a capacity of 8 or more doughnuts might have to be removed, replaced and re-coated with a bare spot on only one doughnut location. In addition to the cost of re-coating the trays is the considerable cost of a technician's time to remove and replace the bare tray and the down time for the entire line. Trays being re-coated must necessarily be taken out of service, thereby disadvantageously disrupting the production process, and generally requiring a commercial establishment to have a back-up supply of proofing trays to substitute for the trays being re-coated. The need to have a back-up supply of trays disadvantageously increases the overall equipment cost of producing a bakery product, and in addition may disadvantageously increase storage and other overhead costs.

SUMMARY OF THE INVENTION

The present invention provides a modular tray system which overcomes the aforementioned disadvantages of prior art trays. The modular tray system includes one or more tray portions and support members which when assembled provide a tray system. The support members include attachment means, or communicate with end pieces including attachment means, to allow the assembled modular tray system to be attached to transport means for transporting the tray on a conveyer belt or the like.

The modular tray system of the present invention may be advantageously utilized in a commercial process for producing bakery products from dough. As used herein, bakery products refers to dough based goods which are baked or fried, including, but not limited to: breads, rolls, bagels, pastries, doughnuts, pretzels and the like.

The modular tray system of the present invention is particularly advantageous for use in carrying dough products through a proofer. As will be recognized by those of ordinary skill in the art however, the modular tray system of the present invention may also be utilized to carry dough based products at other stages in a commercial process for producing bakery products from dough.

As will be further recognized from the following description the modular tray system of the present invention will also be advantageous for use in fields other than commercial baking.

An advantage of the modular system of the present invention is that a plurality of tray portions may be attached to support members of varying lengths to produce trays of varying dimensions.

Another advantage of the modular system of the present invention is that individual components of the system, the tray portion, the support members, attachment means and/or end pieces may be refurbished and/or replaced independently of each other.

Further details and advantages of the modular system of the present invention are provided by the drawing figures and the following more detailed description.

DETAILED DESCRIPTION OF THE INVENTION

Figure 1A:
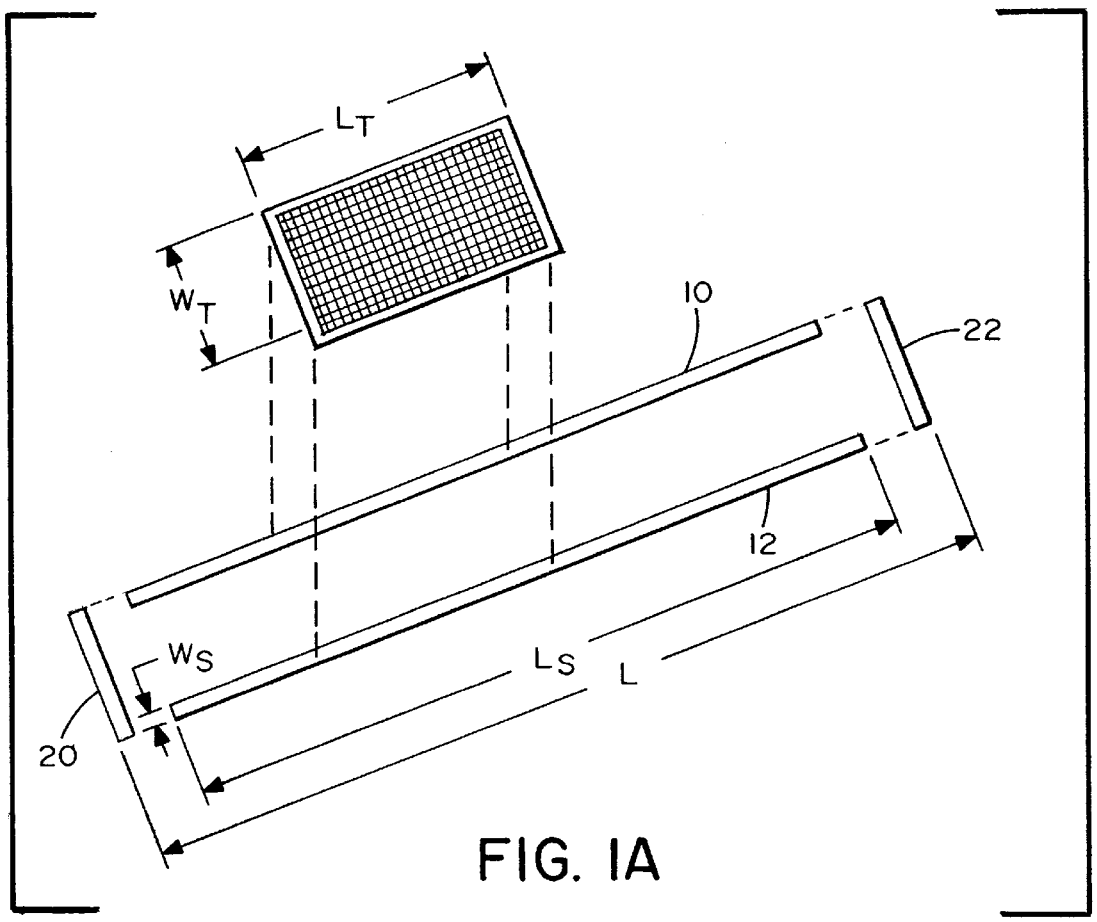
FIG. 1a depicts in exploded view.

According to the present invention a modular tray system comprises support members and a tray portion fastenable, preferably releasably fastenable, to the support members, wherein the support members include attachment means, or communicate with end pieces including attachment means, for attaching, preferably releasably attaching, the modular tray to transport means for transporting the modular tray system, for example on a conveyer line or through a proofer.

Support members of a wide range of materials and shapes are suitable for use in the present invention. The support members utilized in a particular embodiment of the modular tray system should be sufficiently strong to support the tray portions and the items to be placed on the tray portions. For example, where the modular tray system will be utilized in a proofing process, the support members should be sufficient to support the tray portions and the dough resting upon the tray portions while the modular tray system is carried through the proofer.

For many applications, it will be advantageous to use elongated members as support members. The cross section of the elongated members could be of any shape including, but not limited to, round, substantially round, ellipsoidal, "U" shaped (channel), "T" shaped, square, or polygonal.

Suitable support members may be fabricated from wood, metal, plastic or a combination thereof, with metal and/or plastic being preferred. The choice of material and construction will be based on a number of factors, for example, cost, ease of construction, and/or requirements of the application in which the modular tray system will be utilized including, sanitary requirements, load carrying capacity, span and/or the process operating conditions (temperature, humidity and the like) that the modular tray system will encounter. It is believed that the selection of a suitable material for the support members is within the skill of those of ordinary skill in the art. As set forth in more detail below with reference to sample embodiments of the present invention, utilizing a pair of round stainless steel tubes as support members may be preferable for many applications. The tubes may be bent or otherwise modified, e.g. by tapping, to provide attachment means, provide means for securing the support members to end pieces including attachment means and/or to provide additional support to the overall structure of the modular tray system. Further details relating to the support members are set forth below with reference to specific embodiments of the modular tray system of the present invention.

A tray portion suitable for use in the modular tray system of the present invention will comprise a carrying surface and means for fastening the tray portion to the support members. The carrying surface should be of sufficient size to carry the items which will be transported. A generally preferred carrying surface will have a parallelpiped shape, but other shapes may be utilized. The size of the tray portion in the direction of motion as well as in its span direction (span between the transport means) is a function of the number and size of the dough or items the tray portion will carry. The choice of material and construction will be based on a number of factors, for example, cost, ease of construction, and/or requirements of the application in which the modular tray system will be utilized including, size of the apparatus utilized, sanitary requirements, load carrying capacity, span and/or the process operating conditions (temperature, humidity and the like) that the modular tray system will encounter. The carrying surface may be of any design, including, but not limited to, solid, pierced, or mesh. For use in a proofer, a mesh or pierced carrying surface will facilitate circulation of humid, warm (100–135° F.) air to as much of the dough's surface as is practical.

In the modular system of the present invention the tray portion may be constructed from any material including metals, such as stainless steel or aluminum, plastics and thermoplastics (such as thermoplastic acetal resins marketed under the trademark "Delrin" by E.I. DuPont de Nemours & Co., 1007 Market Street, Wilmington, Del.) and the like approved for use with food products, fabric, or combinations thereof. For use in a proofer, the carrying surface of the tray portion is preferably coated, or otherwise covered or constructed from any "anti-stick" materials such as tetrafluoroethylene fluorocarbon (TFE) polymers and fluorinated ethylene-propylene (FEP) resins marketed under the trademark "Feflon" by E.I. DuPont de Nemours & Co.

More preferably, for use in a proofer, the tray portion is completely constructed from an anti-stick material, preferably Teflon, by molding or another process for producing shaped and formed articles from polymer resins. "Tefzel" an injectable teflon alloy, produced and marketed by E.I. DuPont de Nemours & Co. is an especially preferred anti-stick material for construction of the tray portion. The parameters dictating the size of such a modular tray are the molding characteristics of the plastic being used, if a mesh surface is used, how fine a mesh and in turn how difficult it is to make the plastic flow to the far reaches of the mold, the size of the dough shape being proofed and other practical cost and molding factors. Consistent with these factors there is a wide range of acceptable sizes for an injection molded embodiment and vastly wider range for other modular tray constructions.

The means for fastening, or releasably fastening, the tray portion to the support members may comprise any conventional fastening means such as mechanical fastening means including screws, nuts and bolts, rivets and the like; and adhesive means, for example using an adhesive compound to join a tray portion and support members. Preferably the tray portion is releasably fastened to the support members to permit the tray portion to be easily separated from the support members, for example to allow individual tray portions to be replaced.

The means for releasably fastening the tray portion to the support members may take any of a number of forms. In embodiments where the support members are circular in cross section, a wide range of releasable fastening means are possible, including spring clip means, integral or attached to a tray portion constructed from injection molded plastic, sheet metal or other suitable material. Preferably, the tray portion is constructed in a manner such that the tray portion may be press (snap) fit onto the support members. Such a tray portion may comprise elongated groves or channels with pronounced edges, or flanges along the edge, for releasably engaging the support members.

Further details relating to the tray portion are set forth below with reference to specific embodiments of the modular tray system of the present invention.

Among the attachment means for attaching, preferably releasably attaching, the modular tray system to transport means for transporting the modular tray system, are included attachment means forming part of the support members and attachment means forming part of end pieces which engage, preferably releasably engage, the support members.

As used herein, attachment means includes projections or other means from the modular tray system which engage transport means, as well as holes, orifices and other means forming part of the modular tray system for receiving projections, pins and the like from the transport means. Embodiments of attachment means suitable for use in the present invention, include, but are not limited to the embodiments discussed below and depicted in the attached Figures.

For many applications the attachment means engage and pivot upon pins, or other devices projected inwardly from the conveyor chains or belts which will carry the modular tray system. Generally these pins will include a retaining ring or other similar purpose device to prevent the attaching means from slipping off the pin as a result of excessive lateral flexure of the chain or belt conveyor.

The attachment means communicate, either directly or through an end piece, with the support members which support the tray portions and the items carried by the trays. The geometry of the attachment means and/or end pieces preferably results in the center of gravity of the tray portion and all the mass supported by the tray being positioned below the center of the chain's protruding pin. This geometry advantageously minimizes tipping of the modular trays as they pass over sprockets or rollers and rotate from an upward to a downward direction, while being carried by the conveyer belt or chain.

As set forth above, the attachment means may form part of an end piece which engages, preferably releasably engages, the support members. The end piece may have any shape. A triangular shape end piece including attachment means, such as those illustrated in the drawing figures, and described below is advantageous when it is desired, as part of the process utilizing the modular trays, to not only tip the trays over for ejection of the product being carried by the trays, but do so as suddenly as the generally very slow speed of the conveyor permits. The tapered sides of the triangular shaped end piece may be utilized to engage a stationary surface at a point close to and just below the pivot point to accomplish this result.

As will be recognized by those of ordinary skill in the art, a number of different attachment means may be utilized in the modular tray system of the present invention to attach the modular tray system to transport means in a piece of processing equipment without departing from the scope or spirit of the present invention. For example, in addition to the means discussed above, for certain applications it may be sufficient to rivet, weld, bolt, screw or otherwise substantially permanently secure the modular tray system to transport means. This is especially true in view of the fact, explained in more detail below, that the modular tray system of the present invention allows for the replacement of tray portions while the tray system is attached to the transport means, or otherwise located in a piece of processing equipment. Thus, for certain applications it may be sufficient to simply provide a hole, orifice or other receptacle for a rivet in the modular tray system as means for attaching the tray system to transport means.

End pieces may be constructed from any material including metals, such as stainless steel or aluminum, plastics, including thermoplastics (such as thermoplastic acetal resins marketed under the trademark "Delrin" by E.I. DuPont de Nemours & Co., 1007 Market Street, Wilmington, Del.), and the like (in the case of a proofer tray, preferably approved for use with food products) or combinations thereof. The choice of material and construction will be based on a number of factors, for example, cost, ease of construction, and/or requirements of the application in which the modular tray system will be utilized including, size of the apparatus utilized, sanitary requirements, load carrying capacity, span and/or the process operating conditions (temperature, humidity and the like) that the modular tray system will encounter.

For modular tray systems of the present invention designed for use in a proofer, the attachment means may be, but need not be, given an anti-stick coating as the attachment means will generally not come into contact with the dough being carried by the tray. Preferably, the attachment means are injection molded out of a plastic such as acetal suitable for the wear of pivoting and sliding in a high humidity, warm but not hot location.

In a preferred embodiment of the modular tray system of the present invention, the end pieces are in releasable engagement with (releasably engage) the support members. The releasable, modular construction permits optimizing the end pieces for anti-wear, anti-friction functions, but in addition should the end pieces ever require replacing due to excessive wear, the individual end pieces may be quickly replaced and allow the otherwise usable tray modules on the same tray to continue in service.

Further details relating to the end pieces and attachment means for attaching the support members to transport means are set forth below with reference to specific embodiments of the modular tray system of the present invention.

The modular tray system of the present invention may be assembled by inserting the support members into the end pieces, or attachment means, and securing if necessary. Next the tray portion may be fastened to the support members. For certain embodiments of the present invention, wherein the support members, attachment means and tray portions are all releasably attached to each other, the last tray portion may serve as a "keystone" to complete the assembly and "lock" the components in place.

In a preferred embodiment of the present invention, a modular tray system for use in a dough proofer comprises: a support members spanning across the width of the proofer chamber between a pair of conveyor chains, the support members including, or in communication with, a pair of end pieces including attachment means that engage and pivot upon pins projecting inwardly from the sides of said chains and one or more tray portions fastened, preferably removably/releasably fastened to the support members. The length (span) of the tray portion is preferably selected so that multiple tray portions will combine with the end pieces and attachment means to provide a combined span that will equal the span between the pairs of conveyor chains of the proofer which will carry the modular tray system. Although tray portions may be made in varying lengths, it will be advantageous for many commercial processes to standardize on a tray portion of a particular size, and thus a particular length. Modular tray systems of varying overall lengths may be produced by utilizing multiple tray portions. An algebraic expression of this relationship may be illustrated as follows: If "L"=the span between the conveyor chains or belts, or the desired overall length of the modular tray, "$L_T$"=the length of the modular tray, "N"=the number of modular trays and "$L_E$"=the thickness of the end piece and attachment means; then $L=(L_T)\times(N)+2(L_E)$. Where the support members include integral attachment means "$L_E$"=the thickness of the attachment means portion of the support member. As will be recognized by those of ordinary skill in the art, the foregoing algebraic expression is provided for illustration purposes and should not be construed to limit the scope of the present invention. For certain processes, it may be advantageous to leave gaps between tray portions and/or end pieces, for example to allow for thermal expansion. Alternatively, it may be advantageous to have tray portions of more than one standard length. All of these embodiments fall within the scope of the present invention.

The features and advantages of the modular tray system of the present invention are further explained in the following paragraphs with reference to the embodiments of the present invention depicted in the drawing figures.

An exploded view of an embodiment of the system of the present invention is shown in FIG. 1a.

Figure 1B:
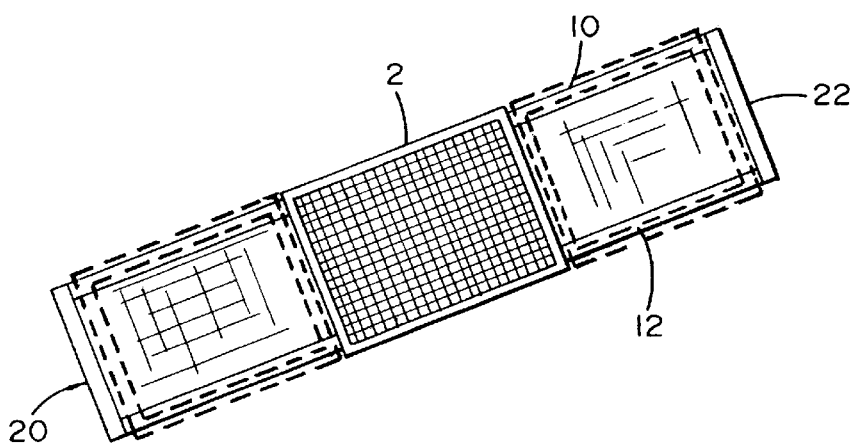
FIG. 1b depicts in assembled view, an embodiment of a modular tray system of the present invention.

Referring to FIGS. 1a and 1b, an embodiment of the modular tray system of the present invention comprises, a tray portion, 2, support members 10 and 12, and end pieces 20 and 22. Tray portion 2, is releasably fastenable to support members 10 and 12 which are in turn releasably engage end pieces 20 and 22 as shown by the dashed lines in FIG. 1a. FIG. 1b shows the modular elements attached in the manner the modular tray could be utilized in a commercial process.

"L" represents the overall length of the modular tray system, and may be varied by varying the length of support members 10 and 12, and or by varying the thickness of end pieces 20 and 22. Length L may be determined by, and generally will depend on, the design of the processing equipment which will carry the modular tray, in particular by the distance between the transport means to which each end of the tray will be attached. Generally, for use in a proofer, length L will range from 12 inches to 72 inches, preferably from 20 inches to 50 inches.

As shown in FIGS. 1a and 1b, tray portion 2, may be constructed to have a length, "$L_T$" (shown in FIG. 1a) which is less than length L. "$L_S$" represents the length of the support members utilized in the modular tray system. To form a complete modular tray, a plurality of tray portions 2, may be utilized, having a combined length of approximately L, minus the length or thickness of the end pieces. The additional tray portions are shown in dashed outline in FIG. 1b.

Having $L_T<L_S$, the length of the support members 10 and 12, allows the overall length of the modular tray system to be easily varied to fit on a wide variety of processing equipment such as proofers, simply by varying the length of the support members and constructing the modular tray system with a sufficient number of tray portions. For example, for an overall length L which is approximately 3 times $L_T$, three tray portions are utilized. In general, the number of tray portions utilized will equal L divided by $L_T$ rounded to the next smallest integer.

Generally $L_S$ will be approximately equal to, or slightly less than L. Length $L_S$ will depend on the design of the end piece including its attaching means and, in particular, by the distance between the transport means to which each end of the tray will be attached. Generally, length $L_S$ will range from 11 inches to 72 inches, preferably from 18 inches to 50 inches.

"$W_S$" represents the width or diameter of the support members 10 and 12 utilized in the modular tray system. Width or diameter $W_S$ will depend on the materials utilized to construct the support members, and in particular the strength of the materials. For support members constructed from metal rods, $W_S$ will generally will range from 0.125 inch to 0.75 inch, preferably from 0.188 inch to 0.5 inch. More preferably, $W_S$ will equal 0.250 inch.

As set forth above, support members 10 and 12 may be of any cross-sectional shape, but are preferably circular in cross-section. Support members may be produced from any material but are preferably produced from stainless steel, aluminum and the like. In general, it is preferable for the support members to be substantially rigid, however the modular tray system will perform capably so long as the combination of the support members, attached tray portions and attached end pieces or the like, form a sufficiently rigid tray to support the products to be carried. As set forth above, the length of the support members may be easily varied to produce modular trays of different lengths.

The support members may include means which facilitate fastening the attachment means (end pieces) to the support members, for example holes tapped into the end of each support member for engaging screws fastened through the end pieces. This type of arrangement is depicted in FIG. 3c.

Figure 2A:
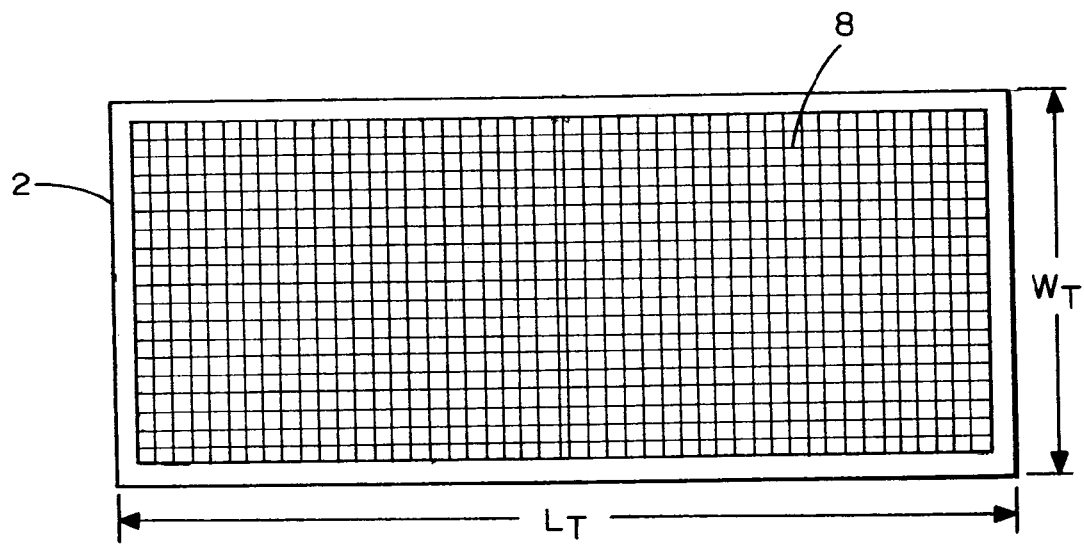
FIGS. 2a, 2b and 2c depict top, end and bottom views respectively, of an embodiment of a tray portion for use in the modular tray system of the present invention.
Figure 2B:
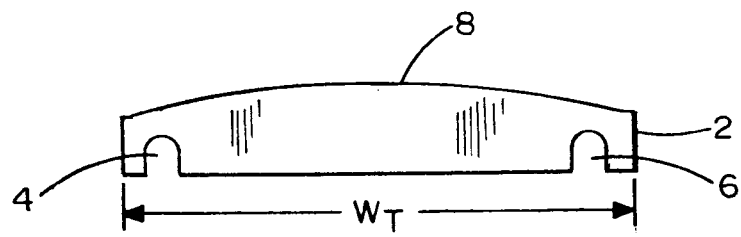
Figure 2C:
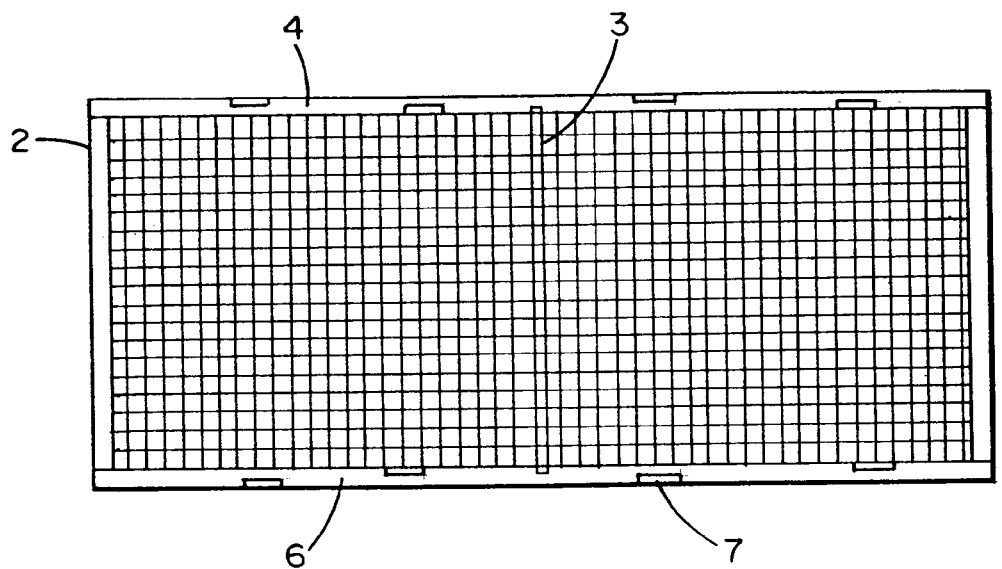

An embodiment of a tray portion, suitable for use in the system of the present invention is shown in greater detail in FIGS. 2a, 2b and 2c. FIG. 2a provides a top view of a tray portion 2. As shown in FIG. 2a, tray portion 2 preferably has a dough supporting surface 8, which is preferably a mesh surface, although a solid, or other surface is also suitable. The length, $L_T$ of tray portion 2, is discussed above and may be varied depending on the number of and the size and shape of the dough to be carried on the modular tray system, the desired overall length of the modular tray system, and the size of the processing equipment which will carry the modular tray system. In a preferred embodiment of the present invention, to be utilized by the assignee of the present application, $L_T$ is sufficient to permit tray portion 2, to carry two dough products. In general, it is preferred that $L_T$ range from 1 inch to 24 inches, preferably from 3 inches to 12 inches and more preferably from 6 inches to 9 inches.

The width, $W_T$ of tray portion 2, may be also be varied depending on the size and shape of dough products to be carried, and the size of the processing equipment which will carry the modular tray system. In a preferred embodiment of the present invention, to be utilized by the assignee of the present application, $W_T$ is slightly larger than the width of one dough product. In general, it is preferred that $W_T$ range from 2 inches to 6 inches, preferably from 3 inches to 5 inches. As will be recognized from the description included herein, and the Figures, the configuration of the attachment means, end pieces 20 and 22 will affect the distance between support members 10 and 12 and will also affect the length of tray portion 2, $L_T$.

FIG. 2b depicts tray portion 2 in end view. As shown in FIG. 2b, for use in a proofer, the dough supporting surface, 8 of tray portion 2 is preferably convexly bowed, with the center slightly higher than each edge, along the axis running between the ends of the tray. It has been discovered that having the dough holding surface convexly bowed makes it easier for the dough to be removed from the tray portion after proofing, in the commercial process utilized by the assignee of the present invention. However, as will be recognized by those of ordinary skill in the art, the surface of tray portion may take any shape, including flat, or concave depending on the use intended for the modular tray system. In addition, the surface of the tray portion may be substantially smooth or rough or may be ridged or otherwise scored depending on the desired end use of the modular tray system and the type of product to be carried on the tray portion. Further, the surface of the tray portion may be of mesh construction as shown, or may be of any other construction, including solid, solid with orifices or the like.

In the embodiment depicted in FIG. 2b, tray portion 2 includes channels, 4 and 6, along the sides, which allow tray portion 2, to be releasably press fit onto substantially circular support members 10 and 12.

FIG. 2c depicts tray portion 2 in bottom view. As shown in FIG. 2c, tray portion 2 may include a reinforcing crossmember 3. Channels 4 and 6 may run the entire length of tray portion 2, as shown, or may comprise one or more short segments. The thickness of channels 4 and 6 should be sufficient to allow tray portion 2 to be press fit onto substantially circular support members 10 and 12. Small retaining flanges, 7, may be formed in the openings of the channels to improve the attachment between the tray portion and the support members. When tray portion 2, is fastened to the circular support members 10 and 12, the walls of channel 4 and 6 flex apart as the flanges pass over the corresponding circular support member and then return to approximately their original configuration.

The width of the channels 4 and 6 will depend on the width ($W_S$) of the support members 10 and 12. Generally the width of the channel will be approximately equal to, or slightly (e.g. up to 5%) greater than the width of the corresponding support member. Thus, generally the width of channels 4 and 6 will range from 0.125 inch to 0.85 inch, preferably from 0.188 inch to 0.6 inch and more preferably will equal approximately 0.250 inch.

In the modular system of the present invention the tray portion may be constructed from any material including metals, such as stainless steel or aluminum, and plastics such as acetal resins marketed under the trademark "Delrin" by E.I. DuPont de Nemours & Co., 1007 Market Street, Wilmington, Del., thermoplastics and the like approved for use with food products, fabric, or combinations thereof. Preferably, the surface of the tray portion is coated, or otherwise covered or constructed from any "anti-stick" materials such as tetrafluoroethylene fluorocarbon (TFE) polymers and fluorinated ethylene-propylene (FEP) resins marketed under the trademark "Teflon" by E.I. DuPont de Nemours & Co. More preferably, the tray portion is completely constructed from an anti-stick material, preferably Teflon, by injection molding or another process for producing shaped and formed articles from polymer resins. "Tefzel" an injectable teflon alloy, produced and marketed by E.I. DuPont de Nemours & Co. is an especially preferred antistick material for construction of the tray portion.

A preferred tray portion for use in a proofer could be constructed as follows. As set forth above, for use in a proofer, the tray portion is preferably constructed with a mesh grid and a curved upper surface in the dough contacting areas. The grid may be elongated downward creating a gridwork of beams for both strength and plastic flow. The upper surfaces of the grid may be rounded and the mold polished to create a very smooth release surface. The dough contact footprint may be reduced by having the tops of the beams that were curved be slightly higher than the beams running laterally. This avoids a large contact patch at the filleted intersections. The reinforcing cross member 3 in the center of the tray portion may be between the contact zones of two doughnut doughs. The reinforcing cross member may perform a strength function, and also serve to improve plastic flow and distribution during injection molding. The tray portion may be gated into the center of the reinforcing cross member to contribute to good molding characteristics, good physical properties and relatively warp-free tray portions. The lower portion of the modular tray portion has a pair of channels to engage the support rods and spaced, intermittent raised projections, 7, (flanges) to create an interface snap fit on those rods. Due to the differential in thermal expansion rates between the plastics selected and the stainless steel rods, the $L_T$ dimension discussed above may be slightly reduced to insure adequate gaps for plastic expansion. The economy of manufacture brought by the present invention makes possible providing the superior product of the present invention at the same or much lower price than the former, labor-intensive, fabricated and then Teflon coated conventional proofer trays.

As discussed above, FIGS. 2b and 2c depict elongated channels which allow the tray portion to be releasably press fit (snap fit) onto the support members, a preferred means for releasably attaching the tray portion to the support members. However, any means for releasably attaching a tray portion to support members are within the scope of the present invention. Other possible means for releasably attaching a tray portion to support members include mechanical fastening means such as spring clips, screws, nuts and bolts, removable rivets and the like; and adhesive means, such as using an adhesive compound to join a tray portion and support members.

Another possible embodiment of the modular tray system of the present invention could comprise one or more modular a sheet metal tray portions releasably fastened to a sheet metal support members by ¼ turn or push-pull, quick release, finger operated fasteners. Such fasteners would preferably be outside the dough contacting areas of the trays.

Figure 3A:
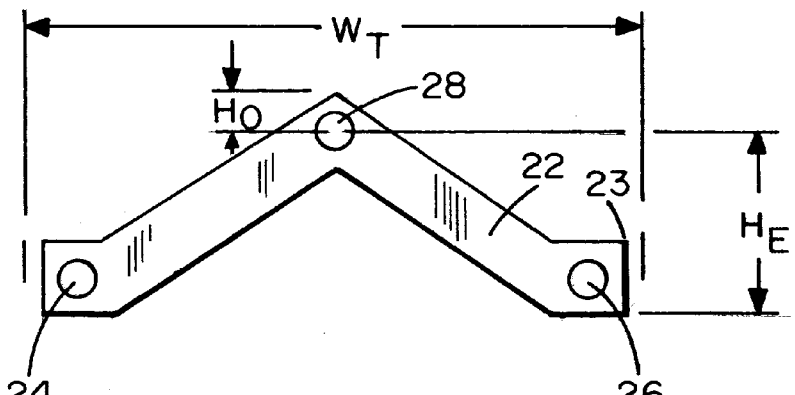
FIGS. 3a, 3b and 3c depict views of an embodiment of an end piece including attachment means and suitable for use in the modular tray system of the present invention.
Figure 3B:
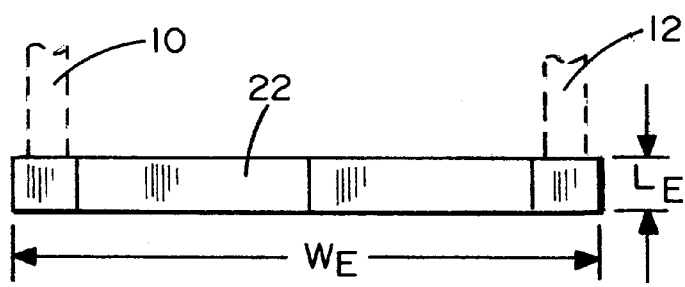
Figure 3C:
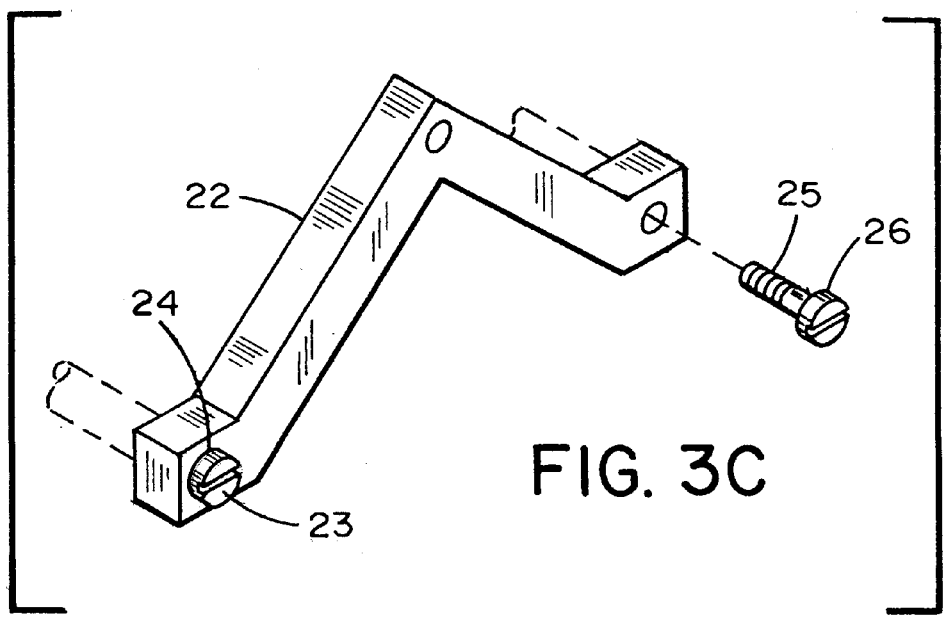

FIGS. 3a, 3b and 3c depict an embodiment of end pieces including attachment means for releasably attaching the support members to transport means. FIG. 3a shows a side view of a embodiment of an end piece, 22, including attachment means for releasably attaching the support members to transport means. The view shown in FIG. 3a is the side of the end piece which would attach to the support members. Although an end piece having a substantially triangular, or trapezoidal, cross section is depicted in the Figure, an end piece for use in the modular tray system of the present invention may have any cross-sectional shape, including rectangular, polygonal, circular and the like as described in detail above.

As shown in FIG. 3a, end piece 22, includes orifices 24 and 26 for receiving support members 10 and 12. Support members 10 and 12 may be releasably press, or snap, fit into orifices 24 and 26 to attach end piece 22 to the support members. As shown in FIG. 3a, the distance between orifices 24 and 26, is less than the width of the tray portion ($W_T$), for the embodiment of the present invention shown in FIGS. 1–3.

The height of end piece 22 is shown as "$H_E$". Generally, the height (sometimes referred to as "drop") of the end piece, $H_E$, will depend on the height of the product being carried on the tray, the thickness of the tray and the design of the processing equipment which will carry the tray, including the means utilized to attach the end piece to the transport means utilized in the processing equipment. In general, it is preferred that $H_E$ range from 1 inch to 5 inches, preferably from 1 inch to 3 inches and more preferably from 1 inch to 1.75 inches.

The overall width of end piece 22 is shown as "$W_E$", and is shown in the top view of end piece 22 provided in FIG. 3b. Generally, the width of the end piece, $W_E$, will approximate the width of the tray portion (which in turn depends on the width of the product being carried on the tray), and the design of the processing equipment which will carry the tray. Thus, in general $W_E$ will be approximately equal to $W_T$.

End piece 22, also includes attachment means comprising an orifice, for receiving a hook, pin, or similar projection from transport means to allow end piece 22 to be releasably attached to the transport means. In this context, transport means include vertical or horizontal conveyer belts, chains or the like, which are utilized to transport dough carrying trays in a commercial process for producing dough based bakery products. As shown in FIG. 3a, orifice 28, may be located at a distance "$H_O$" from the uppermost portion of end piece 22 (measured to the center of the orifice). $H_O$ defines how closely a stationary obstruction may be placed to the center of the tray pivot. The speed with which the tray may be flipped over varies inversely with $H_O$. In general, the distance $H_O$ will depend on the design of the processing equipment which will carry the tray. In general, it is preferred that $H_O$ range from 0.0625 inch to 1 inch, preferably from 0.125 inch to 0.375 inch.

The length of end piece 22 is shown in FIG. 3b as "$L_E$". Generally, the length of the end piece, $L_E$. will depend on the means utilized to attach the support members to the end piece (for example the depth desired for orifices 24 and 26), and the overall length ("L") desired for the modular tray system (which in turn will depend on the design of the processing equipment which will carry the tray). In general, it is preferred that $L_E$ range from 0.5 inch to 5 inches, preferably from 1 inch to 4 inches and more preferably from 1.5 inches to 3 inches. If a flat portion used to maintain the tray in an inverted position, for example after flipping, is unneeded, $L_E$ may be smaller.

FIG. 3c depicts the outside of end piece 22 showing a possible means for fastening support members 10 and 12 to the end piece. As shown in FIG. 3c, screws 23 and 25, having heads 24' and 26' with diameters larger than the diameter of the orifices 24 and 26 may be threaded into a receiving tapped portion of support members 10 and 12 to fasten the support members to the end piece.

End piece 22 may be constructed from any material such as stainless steel or aluminum, and plastics, preferably those approved for use with food products, such as Delrin (discussed above) and other thermoplastic resins, or combinations thereof. Preferably, end piece 22 is molded from plastic, more preferably from a long-wearing plastic, such as nylon, or an acetal such as Delrin.

Figure 4A:
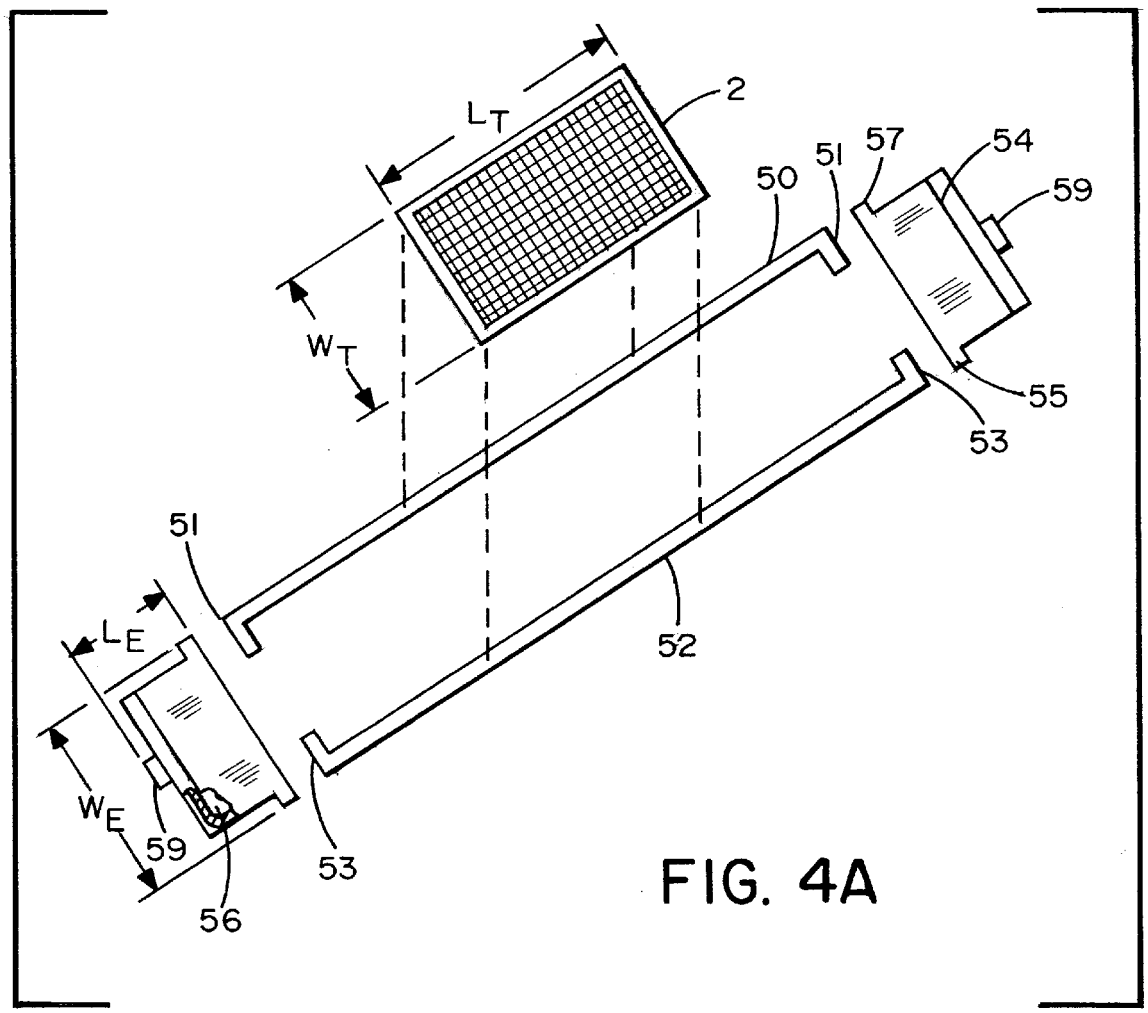
FIGS. 4a and 4b depict in exploded view another embodiment of a modular tray system of the present invention.
Figure 4B:
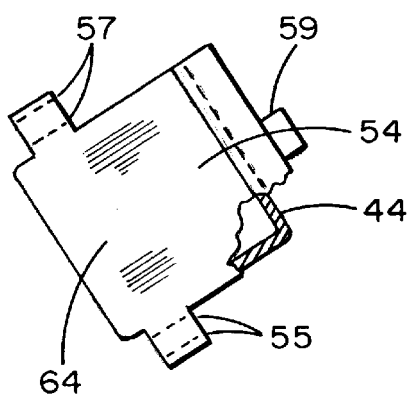

An alternative embodiment of the modular tray system of the present invention, which is a preferred embodiment, is depicted in FIGS. 4a and 4b. As shown in FIG. 4a, support members 50 and 52 comprise elongated members whose ends, 51 and 53, have been bent inwardly at an approximately 90° angle where the support members releasably engage end pieces 54 and 56. In a preferred embodiment of this type each of the support members comprise a stainless steel rod with ends that are bent at 90 degrees and in a relatively common plane with each other. An advantage of this type of construction is that the bent 90° ends, 51 and 53, cooperate with the outside surface 44 and 46, of end pieces, 54 and 56, to prevent the end piece from sliding axially outward and thus off the supporting rods. This construction is shown in more detail in FIG. 4b. Preferably, pairs of outward extending ribs (shown as 55 and 57 on end piece 54) engage either side of the inner portion of the support rods. Applied to a doughnut dough proofing application, such rods made of ¼" diameter, 300 series stainless steel, were found to have adequate rigidity supporting 8 doughnuts and their modular trays. The overall length of support members 50 and 52 is approximately equal to the L of the modular tray system less the projection of the extended hub 59, 59' on each end piece 54, 56.

Tray portion 2, in FIG. 4a may be of a size, and construction, similar to those described above with reference to FIGS. 1a and 1b, and FIG. 2.

Figure 5A:
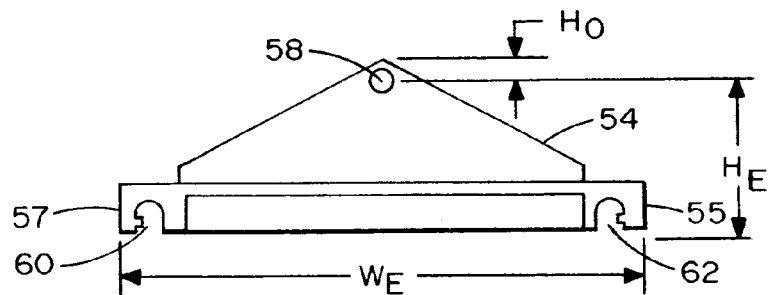
FIGS. 5a, 5b, 5c and 5d depict views of an embodiment of an end piece including attachment means and suitable for use in the modular tray system of the present invention.

FIGS. 5a, 5b, 5c and 5d, depict end piece 54 of FIGS. 4a and 4b, which includes attachment means, in front (inside), top, bottom and back (outside) views respectively. As shown in FIG. 5a, end piece 54 includes channels 60 and 62 formed respectively by rib pairs 57 and 55, for releasably engaging support members 50 and 52. End piece 54 also includes orifice 58 for receiving a pin, hook or similar device projecting from transport means. The dimensions $H_E$, $H_O$ and $W_E$ of end piece 54 may be similar to those described above with reference to end piece 20 and 22, and as shown in FIG. 3.

Figure 5B:
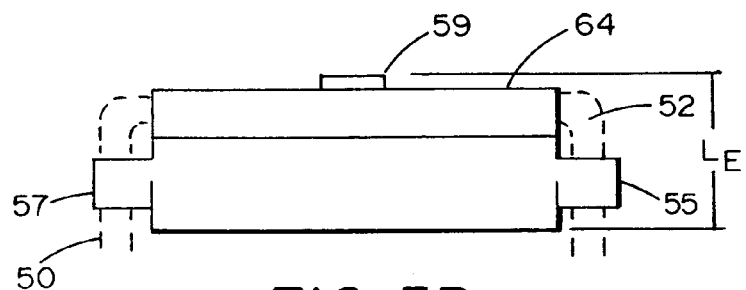
Figure 5C:
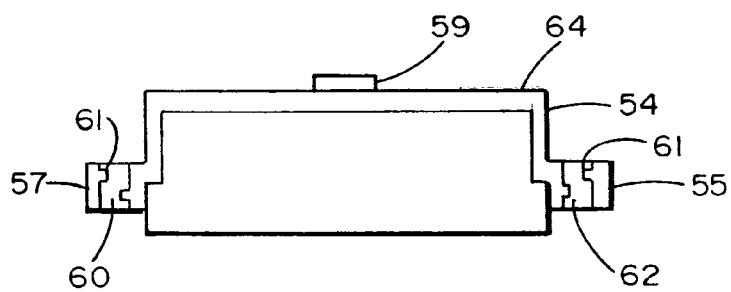
Figure 5D:
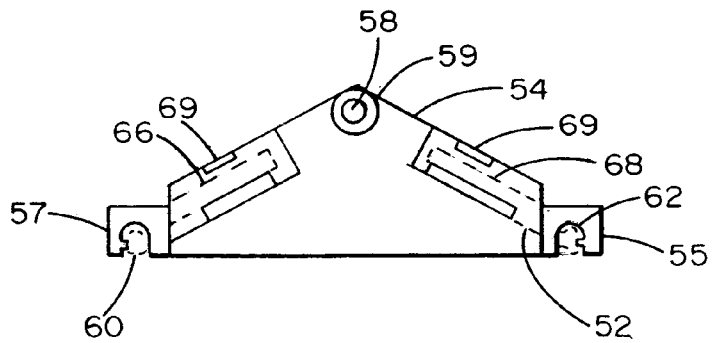

As shown in back view of end piece 54 provided in FIG. 5d, orifice 58 may be located in a hub portion 59 of end piece 54 which projects outwardly in a direction substantially perpendicular to the back portion of the end piece 54 in order to provide additional pivot bearing surface. As also shown in FIG. 5b, rib pairs 55 and 57 may project downwardly to engage inner portions support rods 50 and 52 (shown in relief) prior to their approximately 90° bend. The overall length of end piece 54 is shown as $L_E$.

FIG. 5c depicts a bottom view of end piece 54. As shown in FIG. 5c, channels 60 and 62, formed by ribs pairs 55 and 57, may include flanges 61 at the openings of the channels to assist in enabling end piece 54 to be releasably press fit onto support members 50 and 52. The construction and configuration of channels 60 and 62 and flanges 61 may be similar to that described above with reference to the channels and flanges in tray portion 2.

FIG. 5d depicts a back (outside) view of end piece 54. As shown in FIG. 5d, the back of end piece 54 may include channels 66 and 68 for receiving the bent ends of support members 50 and 52 (shown in relief). Channels 66 and 68 may include flanges 69 to assist in enabling the bent ends 51 and 53 of support members 50 and 52 to releasably engage end piece 54. Channels 60 and 62 also minimize rotation of support members 50 and 52. Such rotation would allow the bent ends 51 and 53 to rotate from their blocking position on the outside of surfaces 44 and 46 of end pieces 54 and 56. Unblocked, they could slide off the ends of support members 50 and 52 and jamb the conveyer means. The construction of the channels 66 and 68 and their flanges 69, may be similar to channels 60 and 62 and their flanges 61.

End pieces 54 and 56 may be constructed in a manner, and utilizing materials, similar to those described above with reference to end pieces 20 and 22. Preferably end pieces 54 and 56 are constructed from a thermoplastic material by injection molding.

As shown in FIGS. 5a–5d, a preferred embodiment of the present invention incorporates an extended hub for longer engagement with projecting pins from a transport means. The hub may also advantageously act as a spacer to keep the remainder of the end piece 54 or 56, and the bent ends of the support members, 51 and 53, from rubbing upon the links of the chain as they move around the many sprockets within an apparatus such as a proofer. In addition, the increased length pin engagement provided by the extended hubs 59 and 59' on the end piece allows for the possible elimination of a snap ring on longer chain pins. This has advantages in addition to cost savings. The snap ring or other suitable retention means has the potential of becoming dislodged and being included in the dough of its or one of the trays below it in an apparatus such as a proofer. The extended length of engagement could allow lateral flexure of the chain without the tray becoming dislodged. Assembly and replacement is also speeded.

This embodiment of the present invention permits assembling one end piece and all tray portions but the last one on the support members. With the second end piece snapped on the support members in a location inward from its final position, the modular tray may be installed in an apparatus such as a proofer by engaging the first end piece on its conveyor pin and sliding the second end piece outward on the support rods and into engagement with their bent ends as it is aligned with and engages its conveyor pin. The missing tray portion may then be snapped in place between the second end piece and the last of the other tray portions. With the last tray portion in place, the end pieces are prevented from sliding inwardly as well as outwardly. The last tray portion thus having a "keystone" effect on the modular tray assembly.

As discussed above, the end pieces 54 and 56 include on their outer or back sides channels 66 and 68 including flanges 69 that create a removable snap fit on the ends of the support members similar to the snap fit created by the flanges 61 in channels 60 and 62 on the underside of ribs 55 and 57 that engage an inner portion of the support members 50 and 52. This added feature restrains the end portions of the support members and aids in rapid assembly of the modular tray system by causing the support members to be aligned axially, laterally and by establishing the correct angle of the free ends with each other to easily receive the other end piece. By so restraining the support members, the modular tray assembly could continue to function even with one of its tray portions temporarily missing. A further advantage of this embodiment which incorporates a flat area 64, best shown in FIG. 5b, into the end piece, is the ability to change the length of the end piece either by an insert in the mold or cutting down unneeded length beyond the later support member attaching means. This added flexibility, with a corresponding change in the length of the support members could enable the modular tray system to be retrofitted into apparatus such as proofers whose span between the chains did not closely approximate the "L" called for in the algebraic example and/or the gaps that would be required between the tray modules would be excessive.

Figure 7:
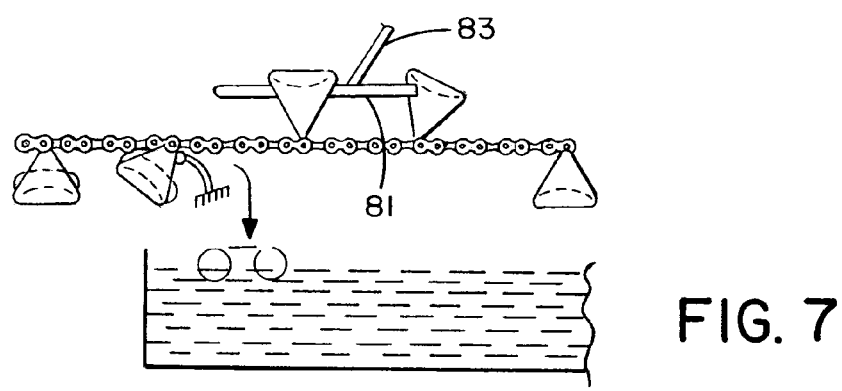
FIG. 7 depicts an example of a mechanism for inverting trays.

A further function of the flat surface 64 is that it may function as the slide surface upon which an inverted tray moves in sliding contact horizontally on a stationary element 81 of the proofer for purposes of a lateral, horizontal, stationary, thin element 83 stripping a sticking dough product from the inverted modular tray. An example of such a stationary element and inverted tray is shown in FIG. 7.

A further advantage of the embodiment of the modular tray system of the present invention depicted in FIGS. 4 and 5a–5d, is that the press fitting of the support members into the end pieces provides torsional stiffness to the overall construction of the tray system.

The modular tray system of the present invention, and in particular the embodiments depicted in FIGS. 1–5 herein, may advantageously reduce the need for snap rings or other retaining devices on the drive chain or belt of a transport means carrying the tray. Many currently utilized conveyer belts or chains utilize extended roller chain pins that include a snap ring groove for engaging a snap ring on a tray for retaining the tray on the conveyer chain. As described above with reference to FIG. 5, the modular tray system of the present invention may be advantageously assembled with the end pieces engaging projections, such as drive pins, on a conveyer chain or belt such that the first end piece is attached to a drive pin and the second end piece is slid axially outward to engage its drive pin and into engagement with the bent ends of the support rods. Thus theoretically, the conveyer chain or belt's drive pins could be longer generally utilized, for example up to 2 inches long or greater. Proofers with longer, standard drive pins which would not escape from the extended hub of the end piece could be utilized with the modular tray system of the present invention to minimize the need, and associated labor costs and problems, in attaching snap rings to the drive pins. The snap fit provided on the ends of the support members would prevent the end member from escaping a drive pin without a retainer even if one or more tray portions were temporarily missing.

The end pieces and embodiments of the attachment means for releasably attaching the support members to transport means are only a few of many suitable attachment means which may be utilized in the modular tray system of the present invention without departing from the scope of the invention. Other attachment means include, but are not limited to, pivot pins and the like. In addition, attachment means may form part of the support members utilized in supporting the tray.

Figure 6:
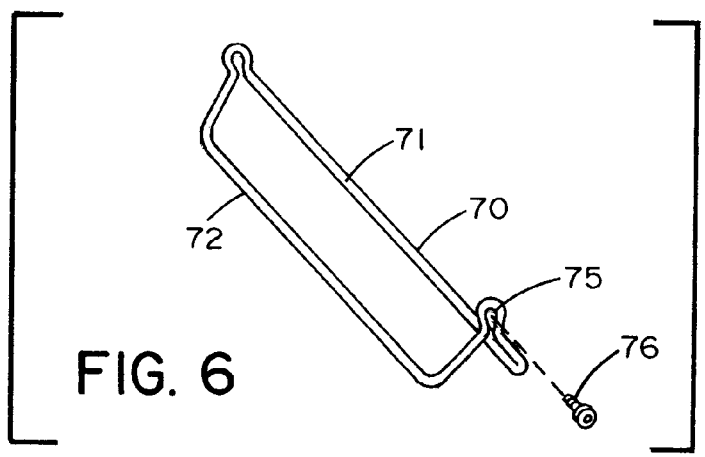
FIG. 6 depicts another embodiment of the modular tray system of the present invention.

As illustrated in FIG. 6 it is possible to take a pair of bent support members, 70 and 72, join their bent ends in a circle, 75 that could act as the basis of a pivot about a transport means projecting pins, with or without a bushing 76. The support members could be butt welded, 71, or otherwise joined, and the resultant form would advantageously combine the support and the end pieces structure and function.

Figure 8:
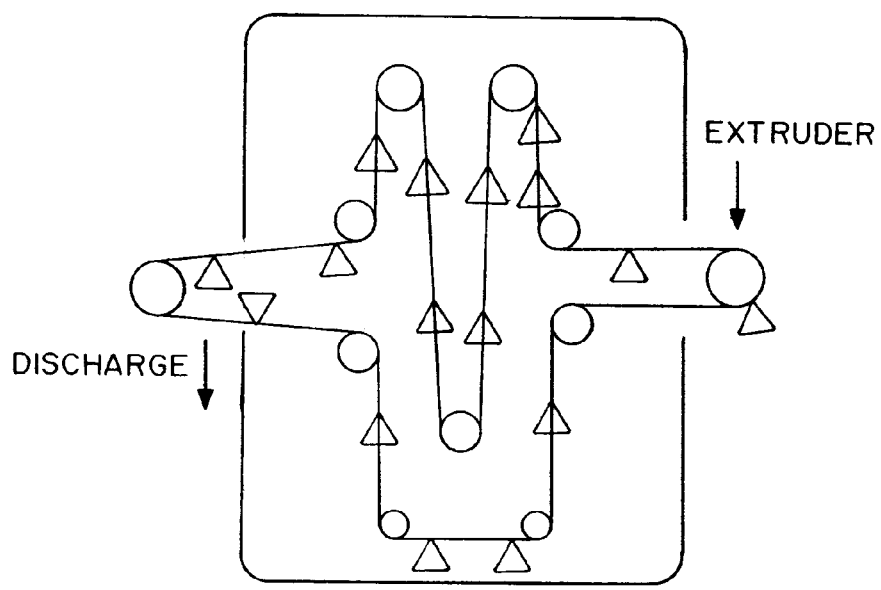
FIG. 8 depicts a proofer apparatus typical of those utilized in the prior art.

FIG. 8 depicts a proofing apparatus utilized in a commercial baking apparatus. As shown in FIG. 8, a modular tray system of the present invention 1, may be utilized to carry dough through the proofing apparatus.

In addition to achieving important manufacturing economies, the present invention also achieves other desirable functional advantages. A preferred embodiment of the present invention provides a solid Teflon alloy tray thereby making the problem of a worn-through coating of a few mills of Teflon a thing of the past. If Teflon coated metal tray portions are employed, the modular tray system of the present invention permits almost instant removal and replacement of the one particular tray portion or module that has signs of excessive wear rather than stopping the apparatus and the rest of the line and laboriously removing the entire tray and replacing it. The generally very slow speed of a proofer conveyor (the slower the speed, the smaller the proofer and the fewer number of trays for the same dough rise time) makes possible, if there are acceptable safety precautions, the removal and replacement of a worn proofer tray module without even stopping the proofer.

A user of the modular tray system of the present invention need store only a limited number of tray modules and end pieces and replace only those modules that are worn, rather than the whole tray. If they are to be re-coated, the re-coating would be only on the particular small tray module that had a bare spot rather than a re-coating of an entire, long proofer tray that only had one or two bare spots. By their nature, the bare spots would likely occur where the dough actually contacts the tray surface. If the operator was using proofers of more than one capacity, only a single size tray portion or module and one size of end pieces would need be inventoried as spares rather than large numbers of complete trays of different sizes for each machine.

In addition a preferred embodiment of the modular tray system of the present invention is self assembling without the use of fasteners. Their elimination and the elimination of the restraining means on the conveyor pins eliminate their cost, the cost of using them and eliminate the possibility that they might ever be included in products intended for human consumption.

As described above, the lost production time required to replace entire trays is very expensive as is the cost of the time of the technician who does it. The modular tray system of the present invention reduces both. In addition, applying Teflon coatings is very expensive, and injection molded Teflon, even its lower cost alloys such as Tefzel, is also very expensive. A preferred embodiment of the present invention has each of its easily detachable components, support members, end pieces and tray portions, made of its own optimal material. Should tray portions produced from a Teflon alloy become damaged, they can very easily and profitably be recycled by the injection molder who made them or some other recycling source. The end pieces, should they ever show signs of excessive wear, can similarly be selectively replaced and their material recycled.

The features and advantages of the modular tray system are further discussed in the following example.

EXAMPLE

A modular tray system of the present invention, substantially as shown in the accompanying FIGS. 2, 4 and 5a–5d was constructed to carry doughnut dough through a proofer.

Three tray portions, each 7.5 inches in length ($L_T$) by 3.625 inches in width ($W_T$) were constructed by injection molding techniques from Tefzel an injectable teflon alloy (the trademark Tefzel, is discussed above). Each tray portion was molded to have a convex, mesh upper surface as shown in FIG. 2a and 2b. The underside of each tray portion was molded to include channels and retaining flanges, and a reinforcing cross member, as shown in FIG. 2c.

End pieces were constructed by injection molding techniques from Delrin 2 acetal resin (the trademark Delrin is discussed above). The end pieces were molded to have a configuration substantially as shown in the accompanying Figures, particularly FIGS. 5a, 5b, 5c, and 5d with the following dimensions:

$W_E$=3.625 inches $H_E$=1.00 inches $H_O$=0.25 inch $L_E$=1.938 inches

Two support members, 26.125 inches long ($L_S$) by 0.25 inches in diameter ($W_S$) were fabricated from stainless steel rod. Each end of each support member was bent to an approximately 90° angle as shown in FIG. 4.

To construct the modular tray system the ends of each support member were snapped into the receiving channels of each end piece. The three tray portions, were then snapped onto support members so that their ends abutted each other. The resulting modular tray system could be utilized in a proofer, such as the one depicted in FIG. 8, in a process for proofing 6 doughnuts per tray system.

It will thus be seen that the objects set forth, among those made apparent from the preceding description, are efficiently obtained by the modular tray system of the present invention. Since certain changes may be made in carrying out the above embodiments of the modular tray system of the present invention, and in their manner of construction, without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A modular tray system for transporting by transport means, said modular tray system comprising:
   a plurality of substantially rigid elongated members, each member having opposite outer ends and each end being bent inwardly towards another elongated member when the elongated members are disposed in parallel;
   a tray portion adapted to be fastened to said substantially rigid elongated members;
   attachment means adapted to communicate with said substantially rigid elongated members for attaching the modular tray system to a transport means for transporting said system; and
   a plurality of end pieces, each of said end pieces releasably engaging the substantially rigid elongated members and including said attachment means, wherein each end piece further comprises a plurality of channels and said substantially rigid elongated members releasably engage said end pieces by being press fit into said channels.

2. The modular tray system of claim 1 wherein each end piece has opposite sides and further includes an outwardly extending rib on each side.

3. The modular tray system of claim 2 wherein said plurality of channels includes a first pair of channels, said first pair of channels being formed by said outwardly extending ribs for releasably engaging said elongated members.

4. The modular tray system of claim 3 wherein said plurality of channels includes a second pair of channels positioned for receiving said bent ends of the elongated members.

5. The modular tray system of claim 4 wherein said first and second pairs of channels further include flanges for creating a removable snap fit on the elongated members and said bent ends of the members.

6. The modular tray system of claim 1 wherein said attachment means is an orifice.

7. The modular tray system of claim 1 wherein the tray portion comprises a mesh tray having a dough receiving surface and an opposing surface.

8. The modular tray system of claim 7 further comprising a plurality of tray portions releasably attached to said elongated members.

9. The modular tray system of claim 7 wherein the opposing surface has a plurality of channels, each channel adapted to be press fit to one of said elongated members to releasably fasten said tray portion to said elongated members.

10. The modular tray system of claim 1 wherein the tray portion is releasably fastened to said substantially rigid elongated members.

11. The modular tray system of claim 1, said end pieces further including an extended hub for longer engagement with a transport means.

12. A modular tray system for transporting by transport means, said modular tray system comprising:
a support member including a plurality of substantially rigid elongated members, each member having opposite outer ends and each end being bent inwardly;
a tray portion adapted to be fastened to said support member; and
a plurality of end pieces, each of said end pieces releasably engaging the substantially rigid elongated members and including attachments means adapted to communicate with said support member for attaching the modular tray system to a transport means;
wherein each end piece further comprises a plurality of channels and said substantially elongated members releasably engage said end pieces by being press fit into said channels.

13. The modular tray system of claim 12 wherein each end piece has opposite sides and further includes an outwardly extending rib on each side.

14. The modular tray system of claim 13 wherein said plurality of channels includes a first pair of channels, said first pair of channels being formed by said outwardly extending ribs for releasably engaging said elongated members.

15. The modular tray system of claim 14 wherein said plurality of channels includes a second pair of channels positioned for receiving said bent ends of the elongated members.

16. The modular tray system of claim 15 wherein said first and second pairs of channels further include flanges for creating a removable snap fit on the elongated members and said bent ends of the members.

17. The modular tray system of claim 12 wherein said attachment means is an orifice.

18. The modular tray system of claim 12 wherein the tray portion comprises a mesh tray having a dough receiving surface and an opposing surface.

19. The modular tray system of claim 18 further comprising a plurality of tray portions releasably attached to said elongated members.

20. The modular tray system of claim 18 wherein the opposing surface has a plurality of channels, each channel adapted to be press fit to one of said elongated members to releasably fasten said tray portion to said elongated members.

21. A The modular tray system of claim 12 wherein the tray portion is releasably fastened to said support members.

22. The modular tray system of claim 12, said end pieces further including an extended hub for longer engagement with a transport means.

* * * * *